United States Patent [19]
Rumreich et al.

[11] Patent Number: 6,002,447
[45] Date of Patent: Dec. 14, 1999

[54] VIDEO SIGNAL PROCESSING APPARATUS

[75] Inventors: Mark Francis Rumreich; Ronald Thomas Keen; John Alan Hague, all of Indianapolis, Ind.

[73] Assignee: Thomson Consumer Electronics, Inc., Indianapolis, Ind.

[21] Appl. No.: 08/687,284

[22] Filed: Jul. 25, 1996

[30] Foreign Application Priority Data

Mar. 7, 1996 [GB] United Kingdom .................... 9604857

[51] Int. Cl.⁶ ......................................... H04N 5/21
[52] U.S. Cl. ......................... 348/606; 348/564; 348/465; 348/569; 348/609
[58] Field of Search .................................. 348/461, 464, 348/465, 468, 571, 575, 626, 627, 625, 473, 476, 477, 478, 607, 624, 629, 630, 631, 563, 564, 565, 566, 567, 568, 569, 553, 609; H04N 5/21, 5/213

[56] References Cited

U.S. PATENT DOCUMENTS

| | | | |
|---|---|---|---|
| 3,848,082 | 11/1974 | Summers | 348/473 |
| 3,971,064 | 7/1976 | Milbourn | 358/38 |
| 4,376,952 | 3/1983 | Troiano | 358/166 |
| 4,384,306 | 5/1983 | Liu | 358/166 |
| 4,486,779 | 12/1984 | Marti | 348/464 |
| 4,549,217 | 10/1985 | Sendelweck | 358/243 |
| 4,595,951 | 6/1986 | Filliman | 348/468 |
| 4,977,455 | 12/1990 | Young | 348/468 |
| 5,202,765 | 4/1993 | Lineberry | 358/183 |
| 5,204,748 | 4/1993 | Lagoni | 358/169 |
| 5,299,006 | 3/1994 | Kim | 348/571 |
| 5,329,316 | 7/1994 | Kang | 348/625 |
| 5,386,238 | 1/1995 | Kinghorn et al. | 348/468 |
| 5,386,247 | 1/1995 | Shafer et al. | 348/563 |
| 5,473,481 | 12/1995 | Min | 348/468 |
| 5,512,954 | 4/1996 | Shintani | 348/473 |
| 5,539,471 | 7/1996 | Myhrvold et al. | 348/473 |
| 5,559,560 | 9/1996 | Lee | 348/468 |
| 5,589,886 | 12/1996 | Ezaki | 348/473 |
| 5,596,372 | 1/1997 | Berman et al. | 348/464 |
| 5,696,561 | 12/1997 | Mizuno | 348/563 |

FOREIGN PATENT DOCUMENTS

| | | | |
|---|---|---|---|
| 442478A2 | 8/1991 | European Pat. Off. | H04N 9/78 |
| 60-172891 | 9/1985 | Japan . | |
| 2106746 | 4/1983 | United Kingdom | H04N 5/14 |

OTHER PUBLICATIONS

Lentzer A.: "Picture quality improvements in bus–controlled TV receivers" Electronic Components and Applications., vol. 10, No. 2, Feb. 28, 1990, Eindhoven, NL, pp. 66–77.

Yugami M.: "EDTV With Scan–Line Video Processor" IEEE Transactions on Consumer Electronics., vol. 38, No. 3, Aug. 30, 1992, New York, US, pp. 553553–562.

Köhne H.: "2–H–Adaptive Combfilter Video Processor" IEEE Transactions on Consumer Electronics., vol. 37, No. 3, Aug. 30, 1991, New York, US, pp. 303–308.

Harigai M. et al: "LSI Chip Set for Closed Caption Decoder System" IEEE Transactions on Consumer Electronics., vol. 37, No. 3, Aug. 30, 1991, New York, US, pp. 449–454.

Shindo H. et al.: "Microcontrollers for Closed Caption System" IEEE Transactions on Consumer Electronics., vol. 38, No. 3, Aug. 30, 1992, New York, US, pp. 268–272.

Abstract of Japan, vol. 10 No. 8, Jan. 14, 1986 Multipicture Planes Television Receiver.

Primary Examiner—Chris Grant
Attorney, Agent, or Firm—Joseph S. Tripoli; Peter M. Emanuel; Robert D. Shedd

[57] ABSTRACT

Video signal processing apparatus includes a picture enhancement processor for processing a video signal to produce an enhanced video signal. The video signal includes a signal component representing video image data and another signal component representing non-image data such as vertical sync and a binary information component. The binary information component represents binary information that may occur, for example, during vertical blanking such as closed caption data, content advisory information (V-chip), or extended data services information. A control unit modifies the enhancement performed by the picture enhancement processor during intervals of the video signal that include non-image information. Modifying enhancement processing (e.g., reducing or disabling) during intervals that include the non-image information reduces degradation of the non-image information caused by the enhancement processing.

19 Claims, 3 Drawing Sheets

VIDEO SIGNAL PROCESSING APPARATUS

FIELD OF THE INVENTION

This invention relates to video signal processing apparatus generally, and particularly to television apparatus employing picture enhancement processing.

BACKGROUND

Television receivers employing picture enhancement processors are known. There are, for example, processors which provide noise reduction for both luma and chroma, processors which provide vertical and/or horizontal peaking and processors which provide non-linear processing (e.g., so-called "black stretch" or "white stretch" processors), to name but a few.

Typically, picture enhancement processing provides a substantial benefit by improving the subjective appearance of displayed images. However, enhancement processing may produce undesirable effects under certain conditions. One such case is described in U.S. Pat. No. 5,202,765 by Roger L. Lineberry entitled TELEVISION RECEIVER WITH PICTURE IN PICTURE PROCESSING AND NON-LINEAR PROCESSING which issued Apr. 13, 1993. Lineberry found that "black stretch" processing of the main or large picture signal in a picture-in-picture (PIP) television receiver can cause the black level of the small or inset picture to be "modulated" by (i.e., be dependent on) the black level of the main picture. Lineberry addresses the problem by disabling black stretch processing during the small picture interval.

Picture enhancement processing such as peaking can degrade displayed images under certain signal conditions such as when the signal-to-noise ratio is poor or when interference (e.g., impulse noise) is present. For example, in U.S. Pat. No. 4,384,306 by Frank C. Liu entitled VARIABLE PEAKING CONTROL CIRCUIT which issued May 17, 1983, the level of peaking is varied so as to avoid excessive peaking of impulse noise present in the active video or displayed portion of the signal. Also, U.S. Pat. No. 4,376,952 by Troiano entitled NOISE RESPONSIVE AUTOMATIC PEAKING CONTROL APPARATUS which issued Mar. 15, 1983 describes varying peaking as a function of noise by sampling noise during the horizontal blanking interval of a received signal. Another example of varying the level of peaking is video depeaking via AGC control as described in U.S. Pat. No. 3,071,064 by Milbourn entitled VIDEO DE-PEAKING CIRCUIT IN LUMINANCE CHANNEL IN RESPONSE TO AGC SIGNAL which issued Jul. 20, 1976.

SUMMARY OF THE INVENTION

The picture enhancement systems described above involve altering the picture enhancement processing to prevent degrading the video image. The present invention resides, in part, in recognizing that it is desirable to modify picture enhancement processing to prevent degrading information other than video image information. In particular, it has been recognized that it is desirable to modify enhancement processing during a portion of the video signal that represents information other than video image information.

In accordance with a further aspect of the invention, it has been found that a problem exists with enhancement processing apparatus (e.g., for TV receivers, VCR's and the like) of a type in which enhancement processing is applied to a video signal prior to detection of components of the video signal other than the video image component. Examples of non-image signal components include a synchronization component, e.g., vertical sync, and adjunct or auxiliary signal components, e.g., signal components containing binary information. Specific examples of binary information signal components include closed captioning data, viewer content advisory ("V-chip") data, extended data services (XDS) data, Starsight® program guide data, and the like, that may be included in a television signal during vertical blanking intervals. As recognized herein, enhancement processing applied to a video signal prior to the detection of synchronizing or auxiliary binary information components may improve image quality while degrading detection and processing of signal components such as sync or auxiliary binary information.

In accordance with aspects of the invention, video signal processing apparatus comprises a picture enhancement processor for enhancing a selected parameter of a video input signal and control means for modifying the operation of the picture enhancement processor during a particular portion of the video input signal that represents information other than the video image information. In a specific embodiment of video enhancement apparatus described herein as an illustrative example of the principles of the invention, means are provided for identifying a particular line interval that includes binary information and for disabling the picture enhancement processor during those particular line intervals.

BRIEF DESCRIPTION OF THE DRAWING

The foregoing and further features of the invention are shown in the accompanying drawing, wherein.

DETAILED DESCRIPTION

Figure 1:
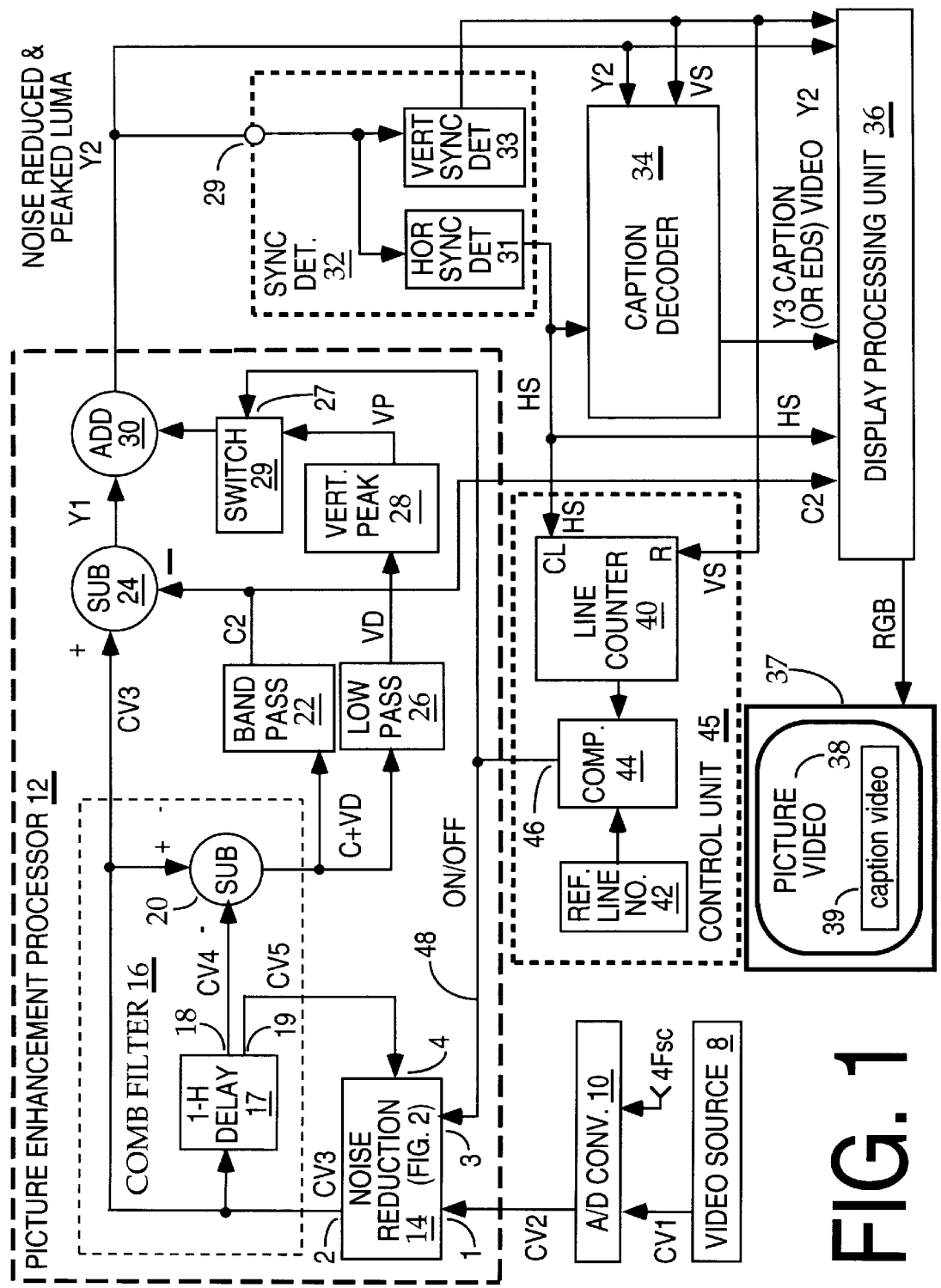
FIG. 1 is a block diagram of a television receiver embodying the invention.

Before considering the details of the television receiver of FIG. 1, it is helpful to consider the problem solved by the present invention. In accordance with an aspect of the invention, it has been found that certain signal processing conflicts can arise in television receivers. Picture enhancement processing of the video image data, such as line recursive noise reduction and vertical peaking, improves the displayed video image by, for example, improving detail in the image. Also, enhancement such as peaking and recursive noise reduction when applied prior to sync detection can improve detection of horizontal sync, thereby greatly reducing horizontal jitter for noisy video. However, as herein recognized, enhancement processing such as recursive processing can degrade information that is included in the video signal but is not part of the displayed image, i.e., non-image information. For example, non-image information in an NTSC television signal comprises signal components that occur during the vertical blanking interval including vertical sync and auxiliary binary information such as, illustratively, closed caption data, extended services (XDS) data, and viewer content advisory information (V-chip) data. Enhancement processing prior to vertical sync detection and auxiliary binary data decoding can result in vertical sync instability and unacceptable bit error rates for binary data.

The described problems could be overcome by detecting vertical sync and decoding binary data from the video signal at the input of the enhancement processing function while detecting horizontal sync and producing the displayed image from the video signal at the output of enhancement processing. However, the enhancement processing circuitry may be included in an integrated circuit (IC) that does not include the sync detection and binary data decoding functions. Using one video signal for horizontal sync detection and another for vertical sync detection would require two output pins from the IC. A complex IC such as a video signal processor typically has limited availability of 10 pins. Thus, it is highly undesirable to require two output pins to supply video signals for sync detection and auxiliary data decoding.

In accordance with principles of the invention, the described problems are solved in the television receiver of FIG. 1 by modifying the enhancement processing during an interval of the video signal that includes information other than video image information. As explained in detail below, modification of enhancement processing involves reducing enhancement during occurrence of non-image information signal components. For example, enhancement processing can be reduced periodically such as during one or more particular line intervals when a non-image component occurs. As a specific example, enhancement processing could be reduced during each line 21 of field 1 of an NTSC signal that includes closed captioning. Another approach in accordance with principles of the invention is to modify enhancement processing throughout each vertical blanking interval. Doing so ensures that neither vertical sync nor auxiliary binary data components are degraded by enhancement processing.

The exemplary embodiment shown in FIG. 1 and described below demonstrates principles of the invention by modifying, i.e., turning off, enhancement processing during line intervals within the vertical blanking interval that convey binary closed caption data. Thus, the video output signal, i.e., at the output of the enhancement processing, can be used for producing enhanced images and for decoding auxiliary binary data without increasing the bit error rate associated with the binary data. The principles of the invention demonstrated by the embodiment shown in FIG. 1 can be extended to include modifying enhancement processing during other non-image information intervals such as during vertical sync, during line intervals other than or in addition to the closed caption data interval, or throughout vertical blanking. Thus, the invention permits using the video signal at the output of the enhancement processor for producing enhanced video images, for sync detection, and for auxiliary binary data decoding.

In FIG. 1, a television receiver includes a video source 8 for providing a composite video input signal CV1 for display by a display unit 37. The composite video signal CV1 includes a picture component conveyed during the "active" or displayed lines of each field and a binary information component (i.e., a closed caption data component in this example) that is transmitted during selected lines of the vertical blanking interval. The binary information is decoded by a caption decoder (34) and displayed as caption video in an inset area or group of lines (39) within the main picture video 38 displayed by display unit 37.

Composite video signal CV1 is converted to digital form by means of an analog-to-digital converter 10 which, illustratively, operates at a sampling rate of four times the color subcarrier frequency (4 Fsc). At this sampling rate one complete color cycle (360 degrees) corresponds to 4 clock periods and one-half of one color cycle (180 degrees) corresponds to 2 clock or sample periods. Advantageously, selection of 4 Fsc sampling simplifies the application of recursive noise reduction of the composite video signal, as will be described.

After conversion to digital form, the digital composite video signal (CV2) is applied to a picture enhancement processor (PEP) 12 for enhancement of selected parameters of the input video signal. In the exemplary embodiment, PEP 12 provides a noise reduced and peaked luminance output signal Y2 and a noise reduced chrominance output signal C, both of which are applied to a display processing unit 36. Unit 36 provides conventional video processing functions such as hue and saturation control, brightness and contrast control, RGB matrixing, etc., and generates a video output signal of suitable form (RGB form is shown) for application to display unit 37.

The noise reduced and peaked luminance signal Y2 is also applied to a caption decoder 34 that generates a caption video signal Y3 for display (39) within the area of the main picture video signal 38 displayed by unit 37. The caption video signal may comprise, for example, closed caption data which is transmitted during selected lines of the vertical blanking interval in the United States. Other binary information, such as extended data services (XDS) information in the United States, may be included in the video signal. If desired, data such as XDS information may be decoded in decoder 34 for display along with or in place of the caption information.

After decoding, the caption (or XDS) signal Y3 is applied to processing unit 37 which includes a multiplex switch (not shown) that inserts (e.g., by time division multiplexing) signal Y3 within signal Y2 for display by unit 37. Alternatively, the caption (or XDS) video may be inserted within the picture information by other methods, such as the use of read/write memory storage.

Vertical and horizontal synchronization signals (VS, HS) for processing unit 36 and for caption decoder 34 are provided by a synchronization signal detector 32 (outlined in phantom). Preferably, detector 32 is formed in an integrated circuit having a sync signal input pin 29 to which the noise reduced and peaked luma signal Y2 is applied and having horizontal and vertical detectors (31, 33) for generating the horizontal HS and vertical VS timing signals for decoder 34 and display processing unit 36. These signals are also used by a control unit 45, described later, for controlling the operation of the picture enhancement processor 12.

Picture enhancement processor (PEP) 12 provides the multiple functions of luma/chroma signal separation, recursive noise reduction of the luminance (Y2) and chrominance (CV2) components and vertical peaking of the luminance component Y2.

In detail, in PEP 12 the composite digital video signal CV2 is applied to the input (1) of a noise reduction unit 14 having an output 2 which provides a noise reduced composite video signal CV3 that is applied to a comb filter 16 (outlined in phantom). Comb filter 16 includes a one-line (1-H) delay unit 17 having a first output 18 providing a composite video signal CV4 that is delayed exactly by one horizontal line (1-H) and having a second output 19 providing a composite video signal CV5 that is delayed by one-line less the time period of one-half of one color cycle. Since a sampling period of 4 Fsc has been selected, as previously noted, the composite video signal CV5 is delayed by one line less 2 sample periods (i.e., one half a color cycle). Signal CV5 is then fed back to an input 4 of noise reduction unit 14 for providing "recursive" or feedback operation to thereby reduce the noise of both the chrominance and the luminance components of composite video signal CV3. The details of a preferred recursive noise reduction unit are discussed later with regard to FIG. 2.

Returning to comb filter 16, the one-line delayed composite video signal CV4 provided by delay unit 17 is subtracted from the non-delayed, noise reduced, composite video input signal CV3 by means of a subtractor 20. This forms a chrominance comb filter and produces two components at the subtractor output, namely: (i) the chrominance component "C" of the composite video signal CV3; and (ii) a vertical detail component "VD" of the composite video signal CV3.

Display processing unit 36 requires a chrominance component free of vertical detail information and a luminance component free from chrominance information and, desirably, with augmented (i.e., peaked) vertical detail information. To obtain the separated chrominance component, processor 12 includes a low pass filter 22 which separates chrominance signal C2 from the combined chrominance and vertical detail signals produced by subtractor 24. It will be noted that chrominance signal C2 has received noise reduction since it is derived from the noise reduced composite video signal CV3 produced by noise reduction unit 14.

To obtain a luminance signal Y1, the band-pass filtered and noise reduced chrominance signal C is subtracted from composite video signal CV3 by means of a subtractor 24. To obtain peaking for the resultant luminance signal Y1, the output of subtractor 20 in comb filter 16 is applied to a low pass filter 26 having a passband extending to the lower limit of the chrominance signal band. This separates the vertical detail signal VD from the combined vertical detail and chrominance signals (C+VD). Signal VD is then applied to a vertical peaking unit 28 which generates a vertical peaking signal VP. A switch 29 couples vertical peaking signal VP to an adder 30 where VP is combined with the noise reduced and separated luminance signal Y1 to produce a noise reduced and peaked luminance output signal Y2. Signal Y2 and chrominance signal C2 are applied to units 34 and 36 as previously described to produce the picture 38 and caption 39 displays on display unit 37.

A control unit 45 provides On/Off control of the noise reduction and vertical peaking provided by the picture enhancement processor PEP 12. Unit 45 comprises a line counter 40 which is reset or cleared at the start of each field by the vertical synchronizing signal VS provided by detector 33. Line counter 40 is clocked or advanced to count lines during a field by the horizontal synchronizing signal HS provided by detector 31. A comparator 44 compares the line number provided by line counter 40 with a line reference number provided by a line reference number source 42 to identify lines in the vertical interval that may contain non-image information, e.g., caption data in line 21.

The output 46 of comparator 44 is coupled via a conductor 48 to the control inputs 4 and 27, respectively, of noise reduction unit 14 and switch 29. When a particular line in the vertical blanking interval is identified by comparator 44, the comparator applies an "off" control signal to conductor 48. In the exemplary embodiment, the "off" signal occurs during a particular interval, e.g., line 21, independent of whether the interval includes non-image information. When generated, the "off" signal modifies the operation of the receiver by disabling noise reduction unit 14 and opening switch 29, thereby turning off noise reduction and vertical peaking applied to luminance signal Y2. This minimizes distortion of the caption data amplitude and rise-time so that the caption decoder bit error rate is relatively low. The absence of peaking and noise reduction will not be seen by a viewer since the caption information is conveyed only during the vertical interval, i.e., no caption data lines can be seen in the active display area of display 37.

When lines other than the caption data lines listed in the line reference source 42 are being received, the comparator 44 applies an "on" signal to conductor 48 which enables noise reduction unit 14 and closes switch 29. This enables vertical peaking and noise reduction during portions of the signal that represent video image information so that the "active" or picture representative video signal displayed by unit 37 is visually enhanced. Thus, the receiver of FIG. 1 resolves the previously discussed conflicting requirements of providing low noise and peaked displayed images while ensuring low distortion (both amplitude and temporal) of caption data and providing an improved bit error rate.

Figure 2:
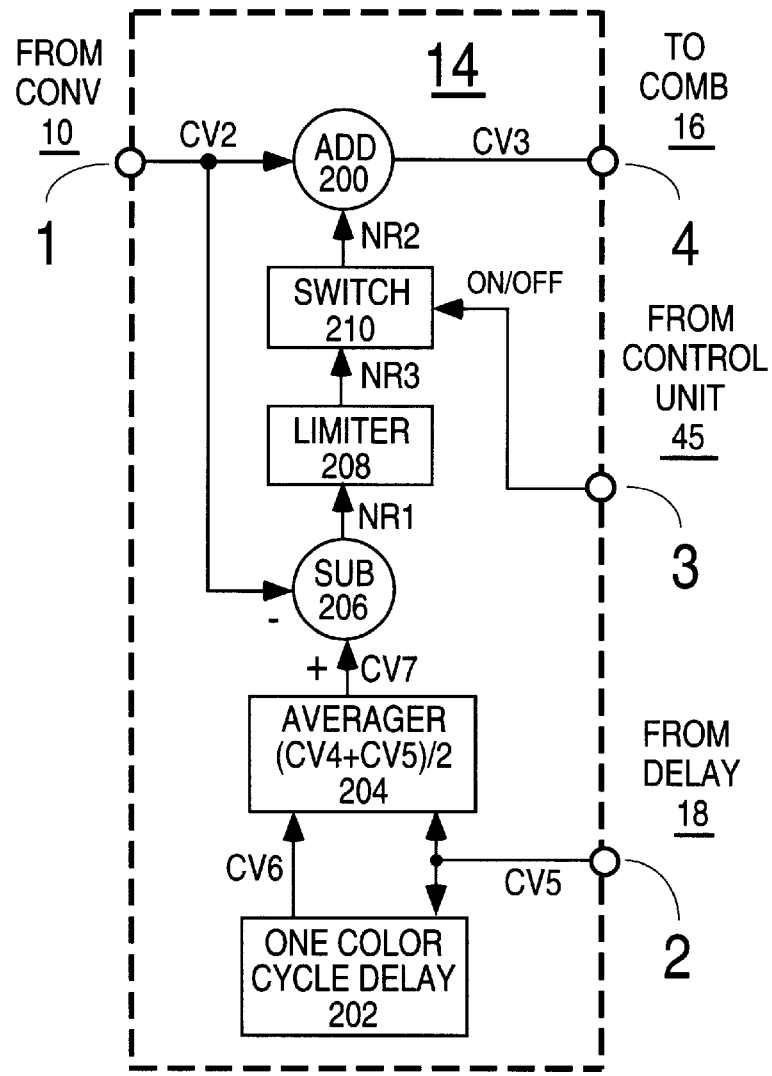
FIG. 2 is a block diagram of a noise reduction unit suitable for use in the receiver of FIG. 1.

Composite video noise reduction unit 14 may be of conventional design provided it is equipped with an on/off control input such as input 3 shown in FIG. 1. An exemplary composite video signal noise reduction unit is illustrated in FIG. 2 which includes one color cycle delay unit 202 that delays the composite video signal CV5 by one full color cycle (360 degrees or 4 clock cycles at the assumed sample rate of 4 Fsc). An averager 204 averages the composite video signal CV5, which is delayed by one line less one-half of one color cycle, with the composite video signal CV6, which is delayed by one line plus one-half of one color cycle to produce an averaged composite video signal CV7 in which the color component thereof is temporally aligned from line to line. What this means is that the averaged signal has a color subcarrier which is of constant phase from line to line rather than alternating 180 degrees from line to line. This is necessary to ensure that the color components of recursively accumulated lines do not cancel in the recursive filtering process which averages successive lines.

A noise reduction signal NR1 is produced by subtracting the composite video input signal CV2 from the line-delayed feedback signal CV7. If the present line is noise-free and identical to the average of previous lines (and no motion is present), the subtraction will produce no output (NR1=0). However, if the present line contains noise, the subtraction will produce a difference representative of the noise. By adding this difference to the input signal CV2, the noise will cancel and the resultant composite video signal CV3 will be noise reduced. The addition, however, can not be done directly because subtractor 206 will also produce an output representative of motion or vertical detail differences. To prevent these "non-noise" components from producing large differences, the noise reduction signal NR1 is limited by a limiter 208 before being added to the composite video signal in adder 200. Suitable limiting levels are very small, e.g., on the order of one or two IRE video signal units. With this limiting level, stationary images will receive substantial noise reduction while moving images will exhibit relatively minor motion artifacts. To provide on/off control of the noise reduction system, the limited noise reduction signal NR2 is applied to adder 200 via a switch 210 controlled by the on/off control signal applied to the control input 3.

In the embodiment of the invention shown in FIG. 1 the principles of the invention were applied to a television receiver for reducing caption errors occurring due to distortion of the caption data signal by the preceding picture enhancement processing (noise reduction and peaking both alter or distort the shape of a waveform). The present invention, however, is of general utility and may be applied to apparatus other than the television receiver shown in FIG. 1. For example, the embodiment of FIG. 3 illustrates a useful application of the principles of the invention to a video cassette recorder (VCR) for producing video tapes.

Video tape recording of television programming also records non-image information components of a television signal including sync and binary information such as closed caption data. It is advantageous to ensure that the non-image information is recorded correctly so that, e.g., data such as closed captioning can be decoded and displayed if desired during playback. However, a VCR may include picture enhancement processing in the video signal processing path. As a specific example, VCR 300 in FIG. 3 includes picture enhancement processor 340 for enhancing the video signal S1 received via terminal 302. Enhancement processor 340 may be of the type previously described in regard to FIG. 1 or of another type which tends to degrade non-image information. In FIG. 3, processor 340 is positioned prior to record and playback circuit 308 in the video signal path. Providing enhancement processing as shown in FIG. 3 enhances the video signal prior to recording, thereby improving the recorded signal and improving the image that is produced during playback of the video tape.

Without additional measures, however, the effects of processor 340 will cause signal S2 at the output of processor 340 to contain degraded non-image information that will be recorded onto video tape via circuit 308, signal S4 and head wheel 306. As a result, a video signal S3 produced from the tape during playback and output via terminal 304 includes degraded non-image information. Subsequent decoding of the degraded non-image information by, for example, a television set coupled to terminal 304 produces an unacceptably high bit error rate and a correspondingly unacceptably high error rate in displayed captions produced from the data.

Figure 3:
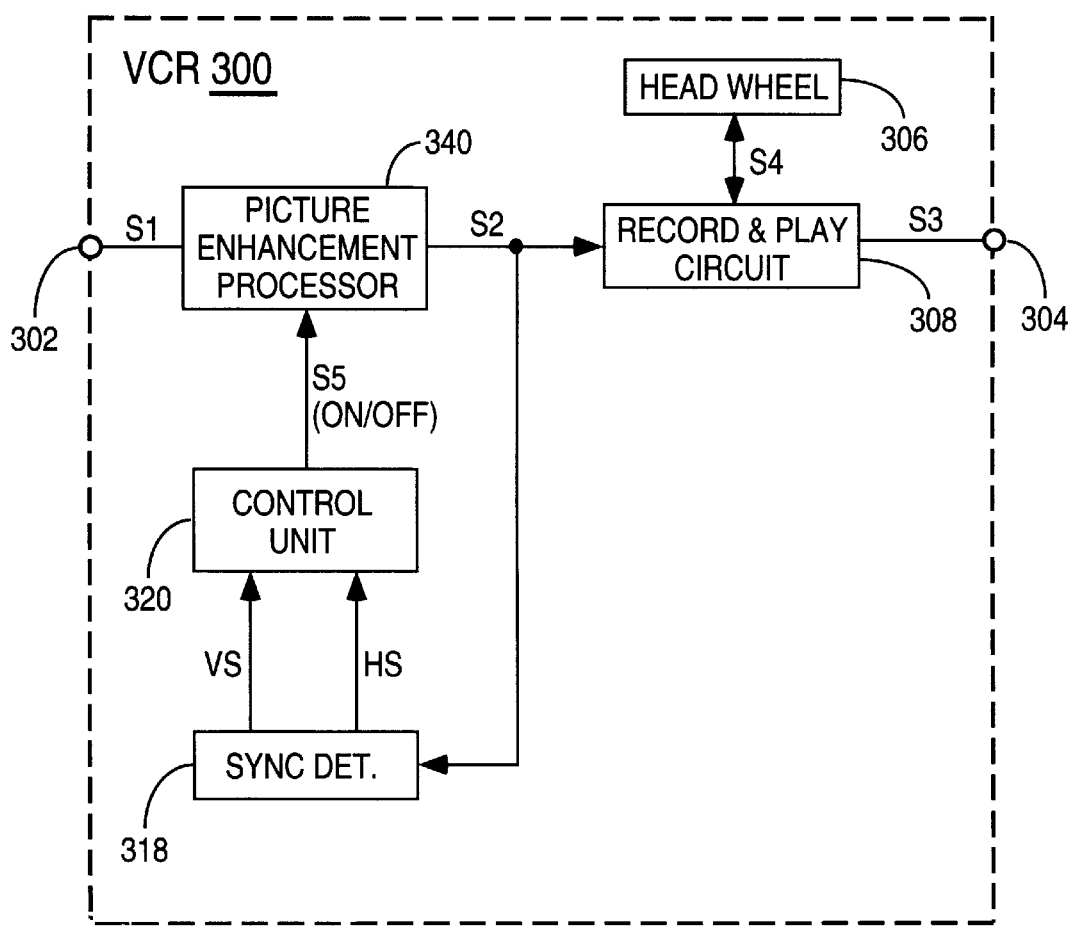
FIG. 3 is a block diagram of a video cassette recorder (VCR) embodying the invention.

VCR 300 in FIG. 3 prevents degrading of non-image information in the recorded signal by modifying the operation of picture enhancement processor 340 in response to a control signal S5 that is generated by control unit 320. The operation of control unit 320 and of processor 340 in response to signal S5 is similar to the above-described operation of control unit 45 and processor 12 in FIG. 1. More specifically, control unit 320 generates signal S5 in response to horizontal and vertical sync signals HS and VS, respectively, produced by sync detector 318 for identifying intervals during which non-image information occurs in the video signal (e.g., line 21 for closed caption data). Processor 340 responds to signal S5 by modifying picture enhancement processing during the non-image intervals. In the exemplary embodiment shown in FIG. 3, processor 340 disables enhancement processing during the non-image intervals established by control unit 320. Accordingly, degradation of non-image information is substantially reduced or eliminated.

In addition to the described embodiments, various modifications are possible. For example, the modification of the operation of the enhancement processing that processor 12 in FIG. 1 and processor 340 in FIG. 3 produce in response to the control signals can vary. In the described embodiments relating to closed caption data, enhancement processing is disabled. However, for other types of data or other types of enhancement processing, it may be desirable for the enhancement processor to reduce the level of processing rather than disable the processor. Also, control units 45 in FIG. 1 and 320 in FIG. 3 could control the respective enhancement processors such that a different level of enhancement processing is provided during each of various intervals or for each of various types of non-image information, e.g., no enhancement during vertical sync and closed caption intervals, reduced enhancement during another interval, and full enhancement during video image information intervals. In addition, the control units could produce the processor control signals such that enhancement is modified to a particular degree throughout an interval that includes various types of non-image information. As an example, enhancement processing could be disabled throughout the vertical blanking interval, thereby preventing enhancement processing from affecting vertical sync and various types of auxiliary binary information. These and other modifications are intended to be within the scope of the following claims.

We claim:

1. Apparatus for processing a video signal having a plurality of Line intervals and tending to include a binary information component during one of said plurality of line intervals; said binary information component representing information other than video image information; said apparatus comprising:

means for generating a control signal indicating when said one of said plurality of line intervals occurs;

a picture enhancement processor for enhancing a selected parameter of said video signal; said picture enhancement processor being responsive to said control signal for modifying the enhancement of said selected parameter during said one of said plurality of line intervals; and means for decoding said binary information component to produce binary data; wherein said picture enhancement processor is responsive to said control signal for reducing enhancement of said video signal during said one of said plurality of line intervals for reducing a bit-error rate of said binary data.

2. The video signal processing apparatus of claim 1 wherein said picture enhancement processor performs noise reduction or peaking of said video signal; said picture enhancement processor being responsive to said control signal for reducing said noise reduction or peaking during said one of said plurality of line intervals.

3. The video signal processing apparatus of claim 1 wherein said picture enhancement processor performs recursive processing of said video signal for enhancing said selected parameter; said picture enhancement processor being responsive to said control signal for disabling said recursive processing during said one of said plurality of line intervals.

4. The video signal processing apparatus of claim 1 wherein said picture enhancement processor is responsive to said control signal for disabling enhancement of said selected parameter during said one of said plurality of line intervals, and for enabling enhancement of said selected parameter during another one of said plurality of line intervals during which said video signal includes video image data.

5. The video signal processing apparatus of claim 4 wherein said one of said plurality of line intervals occurs during a vertical blanking interval of said video signal.

6. The video signal processing apparatus of claim 1 wherein said picture enhancement processor is responsive to said control signal for disabling enhancement of said selected parameter during said one of said plurality of line intervals independent of whether said one of said plurality of line intervals includes said binary information component.

7. Television apparatus, comprising:

a source for providing a video input signal having a picture component representing video image information and having a binary information component comprising binary data;

a picture enhancement processor for processing the video input signal for enhancing a parameter of the video input signal to provide an enhanced video signal;

circuit means, responsive to the enhanced video signal, for displaying the picture component as a main picture and for decoding the binary data and displaying information decoded from the binary data as a caption inset within the main picture; and a control unit for reducing the picture enhancement processing imparted to the video input signal during lines of the vertical blanking interval of the video input signal having the binary information component and without reducing the picture enhancement processing imparted to the video input signal during displayed lines of the picture component for reducing errors in the caption resulting from enhancement processing without reducing the enhancement of said main picture.

8. Video signal processing apparatus comprising:

a picture enhancement processor for enhancing a signal characteristic of an input video signal for providing an enhanced video signal, said input video signal having a first portion including video image information and a second portion including binary data representing information other than video image information;

means coupled to an output of said picture enhancement processor for generating a synchronizing signal in response to said enhanced video signal;

a decoder responsive to said synchronizing signal for decoding said binary data from said enhanced video signal; and control means responsive to said synchronizing signal for modifying the operation of said picture enhancement processor during said second portion of said input video signal including said binary data.

9. The apparatus of claim 8 wherein said control means modifies the operation of said picture enhancement processor during said second portion of said video input signal including said binary data for reducing a bit error rate of said decoder.

10. The video signal processing apparatus of claim 9 wherein said picture enhancement processor performs recursive processing of said input video signal for providing said enhanced video signal; said recursive processing being disabled during said second portion of said input video signal including said binary data.

11. The video signal processing apparatus of claim 9 wherein said second portion of said input video signal includes a sync component representing synchronizing information.

12. The video signal processing apparatus of claim 11 wherein said sync component comprises vertical sync.

13. The video signal processing apparatus of claim 9 wherein said control means modifies the operation of said picture enhancement processor for providing said enhanced video signal with a first level of enhancement during said first portion of said input video signal including video image information and with a second level of enhancement during said second portion of said input video signal including said binary data.

14. The apparatus of claim 13 wherein said first level of enhancement corresponds to a reduced level of enhancement in comparison to said second level of enhancement.

15. The video signal processing apparatus of claim 8 wherein said video signal processing apparatus comprises a video recorder; said video recorder comprising record/play means for recording and playing back said video signal; said picture enhancement processor being coupled between an input of said video recorder and an input of said record/play means; said control means being included in a feedback path coupled between said input of said record/play means and a control input of said picture enhancement processor.

16. Video signal processing apparatus comprising:

a picture enhancement processor for enhancing a signal characteristic of an input video signal for providing an enhanced video signal; said input video signal having a first portion including video image information, a second portion including binary data representing information other than video image information, and a third portion including synchronizing information;

means coupled to an output of said picture enhancement processor for generating a synchronizing signal in response to said enhanced video signal;

a decoder responsive to said synchronizing signal for decoding said binary data from said enhanced video signal; and control means responsive to said synchronizing signal for modifying the operation of said picture enhancement processor during said second portion of said input video signal and during said third portion of said input video signal.

17. The video signal processing apparatus of claim 16 wherein said second and third portions of said input video signal are included in a vertical blanking interval of said input video signal, and said control means is responsive to said synchronizing signal for modifying the operation of said picture enhancement processor during said vertical blanking interval.

18. The video signal processing apparatus of claim 17 wherein said control means disables the operation of picture enhancement processor during said vertical blanking interval.

19. The video signal processing apparatus of claim 17 wherein said control means modifies the operation of said picture enhancement processor during said vertical blanking interval for reducing a bit error rate of said decoder and for reducing instability of said synchronizing signal.

* * * * *